(12) United States Patent
Wright et al.

(10) Patent No.: US 6,604,456 B2
(45) Date of Patent: Aug. 12, 2003

(54) ADJUSTABLE ALIGNER CUP ASSEMBLY FOR PEACH PITTER

(75) Inventors: William R. Wright, Pueblo West, CO (US); David R. Laydon, Jr., Pueblo, CO (US); Barry Spencer Roof, Pueblo, CO (US)

(73) Assignee: Atlas Pacific Engineering Company, Pueblo, CO (US)

( * ) Notice: Subject to any disclaimer, the term of this patent is extended or adjusted under 35 U.S.C. 154(b) by 0 days.

(21) Appl. No.: 10/307,001

(22) Filed: Nov. 27, 2002

(65) Prior Publication Data

US 2003/0101879 A1 Jun. 5, 2003

Related U.S. Application Data

(60) Provisional application No. 60/401,022, filed on Aug. 2, 2002, and provisional application No. 60/336,797, filed on Dec. 3, 2001.

(51) Int. Cl.[7] .............................. A23N 4/04; A23N 4/12; A23N 4/22; A23L 1/00
(52) U.S. Cl. .............................. 99/549; 99/552; 99/559; 99/562
(58) Field of Search .......................... 99/547, 548, 537, 99/538, 549–562, 485, 486, 489–491; 426/485, 484, 231, 518; 209/545, 581, 587, 701, 939; 198/387, 779

(56) References Cited

U.S. PATENT DOCUMENTS

| | | | |
|---|---|---|---|
| 2,969,867 A | | 1/1961 | McClelland |
| 3,179,232 A | | 4/1965 | Rodrigues |
| 3,695,322 A | | 10/1972 | Anderson et al. |
| 3,780,641 A | | 12/1973 | Hole |
| 4,288,461 A | * | 9/1981 | Meissner ..................... 426/231 |
| 4,380,953 A | * | 4/1983 | Anderson et al. ............. 99/549 |
| 4,486,454 A | * | 12/1984 | Erb ............................ 426/485 |
| 4,726,898 A | * | 2/1988 | Mills et al. ................. 209/545 |
| 4,730,719 A | * | 3/1988 | Brown et al. ........... 209/701 X |
| 5,182,983 A | * | 2/1993 | Meissner ..................... 99/486 |
| 5,413,206 A | * | 5/1995 | Paterson et al. ........ 198/383 X |
| 5,855,270 A | * | 1/1999 | Throop et al. .............. 198/394 |

* cited by examiner

*Primary Examiner*—Timothy F. Simone
(74) *Attorney, Agent, or Firm*—Bruce H. Johnsonbaugh

(57) ABSTRACT

An adjustable peach aligner cup assembly 20 is provided for use in an automatic peach aligning and pitting mechanism. An adjustable alignment ring has first and second movable segments 51,52. Segments 51,52 are moved away from each other to align large peaches and are moved toward each other to align small peaches. An actuator 61,62 causes the segments 51,52 to move. An optional sensor 80 is provided which allows the segments 51,52 on a specific aligner cup assembly 20 to be adjusted on a peach-to-peach basis to align a specific peach.

24 Claims, 17 Drawing Sheets

ADJUSTABLE ALIGNER CUP ASSEMBLY FOR PEACH PITTER

CROSS-REFERENCE TO RELATED APPLICATIONS

This application claims the benefit of and priority from U.S. provisional application Ser. No. 60/336,797 filed Dec. 3, 2001 and U.S. provisional application Ser. No. 60/401,022 filed Aug. 2, 2002.

BACKGROUND AND BRIEF SUMMARY OF INVENTION

The present invention relates generally to automatic peach aligning and pitting mechanisms wherein each peach is first aligned relative to its suture line and is thereafter pitted by twisting its halves in different directions relative to the suture line while simultaneously cutting the peach along its suture line with opposed blades. More particularly, the present invention in one embodiment provides an adjustable aligner cup assembly capable of changing size from "peach-to-peach."

Prior art peach pitters which twist the peach halves while cutting the peach into halves are shown in U.S. Pat. Nos. 4,054,675; 4,288,461; 4,380,953; 4,486,454 and 5,182,983. Prior art orientors for fruit other than peaches include roller orientors shown in U.S. Pat. Nos. 4,726,898; 4,730,719; 5,413,206 and 5,855,270.

The closest prior art known to applicants is a peach aligner/pitter mechanism using fixed size alignment rings on each aligner cup assembly, as described in more detail below. The fixed size rings are typically provided in three different sizes to accommodate and properly align different sized peaches: small, medium and large. The use of fixed size alignment rings in turn requires the use of rather complex grading and distribution mechanisms upstream in order to present the proper sized peach to the fixed size alignment ring. These mechanisms have inherent flaws resulting in downgraded fruit. Existing grading systems will typically include a gravity sort station wherein the smallest peaches supposedly fall through the smaller grates or rollers first and the largest peaches fall through larger grates or rollers last. However, smaller peaches frequently "ride" on top of larger peaches past their intended separation point and ultimately fall through an incorrect separation point. That small peach will be carried to a medium or large fixed cup aligner, will not be successfully aligned or pitted, and will become downgraded for use in fruit cocktail, for example.

Another inherent problem with the prior art overcome by the present invention is periodic size distribution problems. A plant with an array of aligner cup assemblies with fixed size alignment rings may have, for example, an equal number of small, medium and large aligners. However, if a load of predominantly small peaches is fed into the grader/sorter, some small peaches will be redirected either manually or automatically into medium or large size aligners. They will not be successfully aligned or pitted and will become downgraded. Similarly, if loads of predominantly large peaches are fed into the grader/sorter, large peaches will be redirected to small or medium aligners, not properly aligned or pitted, and will be downgraded. The downgrading is a significant financial cost to the canner.

When peaches are not properly aligned during the pitting operation, pit fragments are often left in the peach. This requires rather extensive labor and reworking of the peach. During reworking of the peach, the peach half containing any pit fragment will be "spooned" in which a large portion of the peach flesh is removed from the peach half to insure that all the pit fragments are removed. Additionally, if a peach is pitted when it is misaligned, it typically is unsuitable for canning as peach halves; it is often downgraded and must be diced for use in fruit cocktail.

The present invention reduces the downgrading of fruit caused by improper sized peaches being presented to an aligner cup assembly with a fixed size alignment ring. The present invention in one embodiment senses the size of a specific peach presented to a specific aligner cup assembly and automatically adjusts the size of a novel, adjustable alignment ring to that of the peach. The adjustable size aligner cup of the present invention may alternatively be used with a manual actuator or may be used with sensors that measure average size of a batch of peaches to be aligned. The present invention may be used in one embodiment in conjunction with prior art graders. The present invention may also allow the complete elimination of the prior art grader and distribution mechanisms.

A primary object of the invention is to provide an adjustable peach aligner capable of aligning peaches of different sizes.

A further object of the invention is to provide an automatic adjustable peach aligner which in one embodiment is capable of being adjusted to different sizes on a "peach-to-peach" basis, i.e., the aligner is automatically adjustable to a different size for each individual peach to be aligned.

A further object of the invention is to provide an adjustable peach aligner which reduces the amount of downgraded fruit that would otherwise occur when using a non-adjustable peach aligner.

Another object of the invention is to provide an adjustable peach aligner which significantly reduces reliance on and, in some circumstances, facilitates the elimination of prior art size grading, sorting and size distribution systems for peach processors.

Another object of the invention is to provide an automatic, adjustable size peach aligner for use with an automatic peach pitter which reduces the number of pit fragments remaining in the peach segments after the pitting operation.

Yet another object of the invention is to provide an automatic peach aligning and pitting mechanism which is more efficient, more reliable and more cost effective than prior art mechanisms.

Further objects and advantages of the invention will become apparent from the following description and drawings, wherein:

DETAILED DESCRIPTION OF THE DRAWINGS

Figure 1:
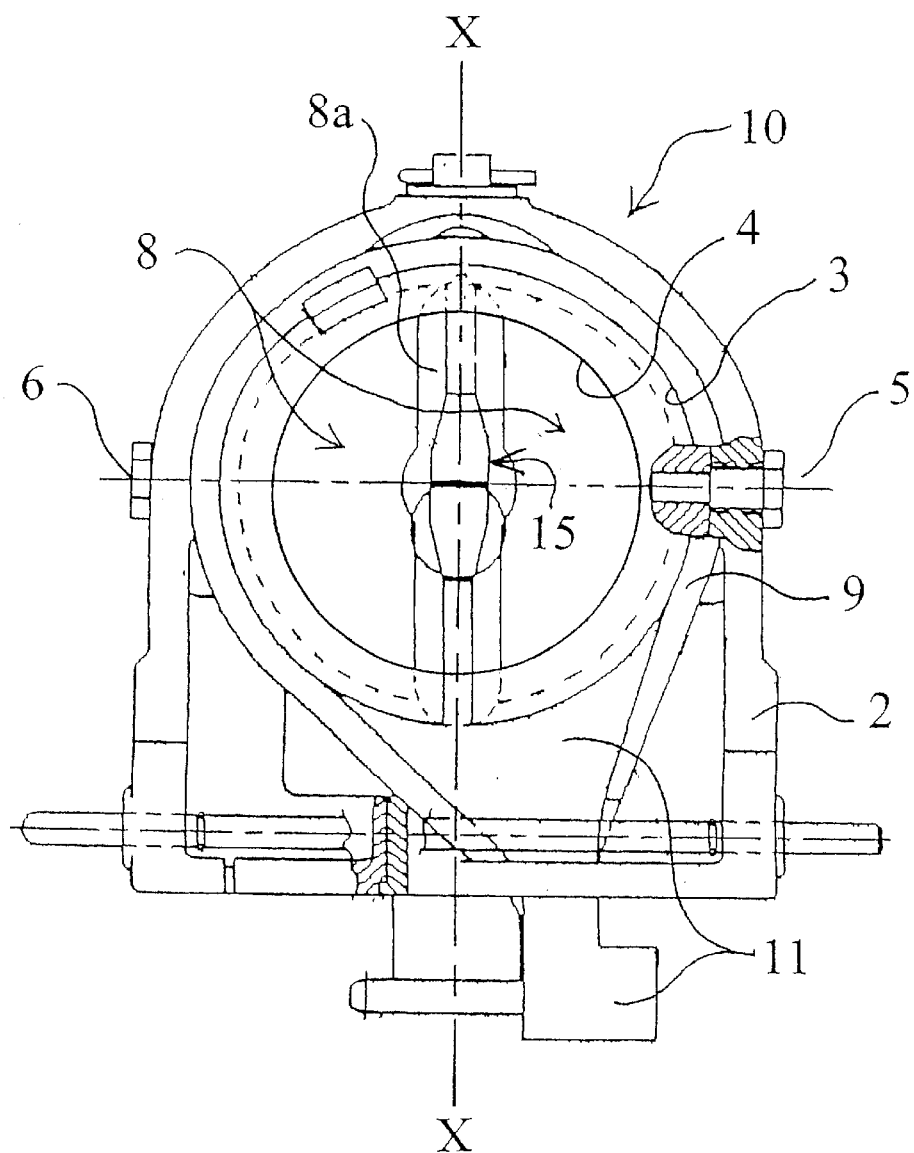
FIG. 1 is a plan view of a typical prior art fixed ring aligner cup assembly.
Figure 2:
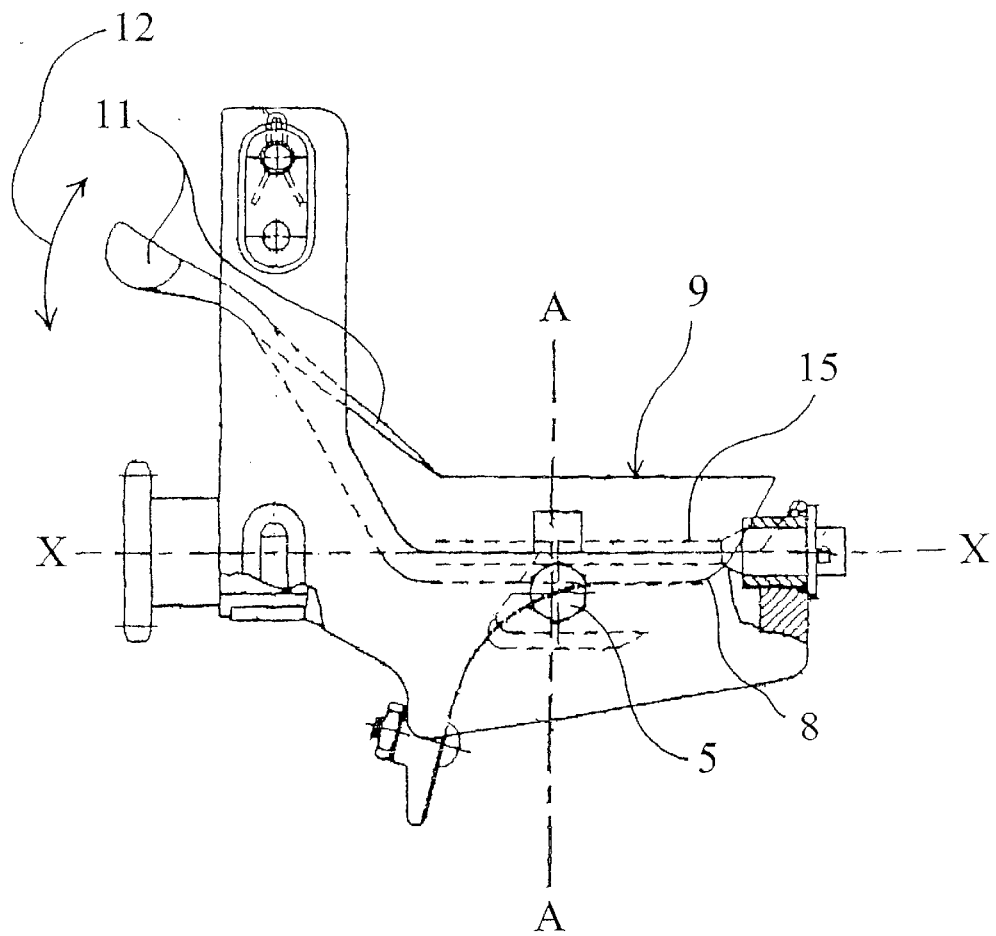
FIG. 2 is a side elevational view, partially in section, of the prior art fixed ring aligner cup assembly of FIG. 1.

FIGS. 1 and 2 illustrate a typical prior art fixed ring aligner cup assembly shown generally as 10. Aligner cup 9 is pivotally mounted on a two part, cup pivot stud 5,6. Cup pivot stud 5,6 is affixed to cup holder 2. Aligner cup 9 lies in a horizontal plane perpendicular to vertical axis A—A (FIG. 2). Aligner cup 9 has a circular groove 3 which is adapted to receive one of three different sized fixed diameter alignment rings. Ring 4 is pressed into groove 3 and cup assembly 10 is ready to align "medium" size peaches. Cup assembly 10 includes a base 8 in which an elongated slot 8a is formed. An eccentric spindle 15 is positioned to rotate in slot 8a to agitate a peach being aligned by cup assembly 10. Rocking arm 11 is connected to cup 9 and is moved to and fro in the direction of arrow 12, causing alignment cup 9 to oscillate about pivot stud 5,6. This oscillation, with the rotation of eccentric 15, agitates the peach until it is aligned.

Figure 3A:
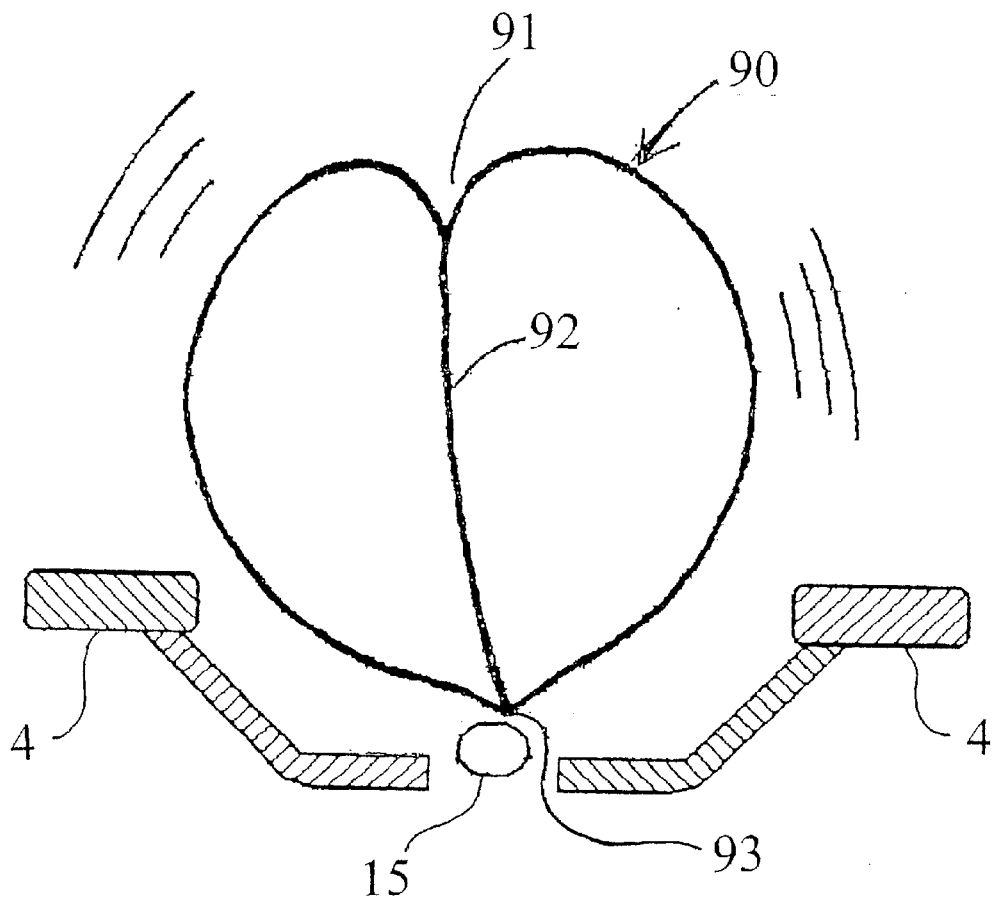
FIG. 3A is a schematic representation showing how a prior art fixed ring aligner agitates a peach properly sized for the aligner.
Figure 3B:
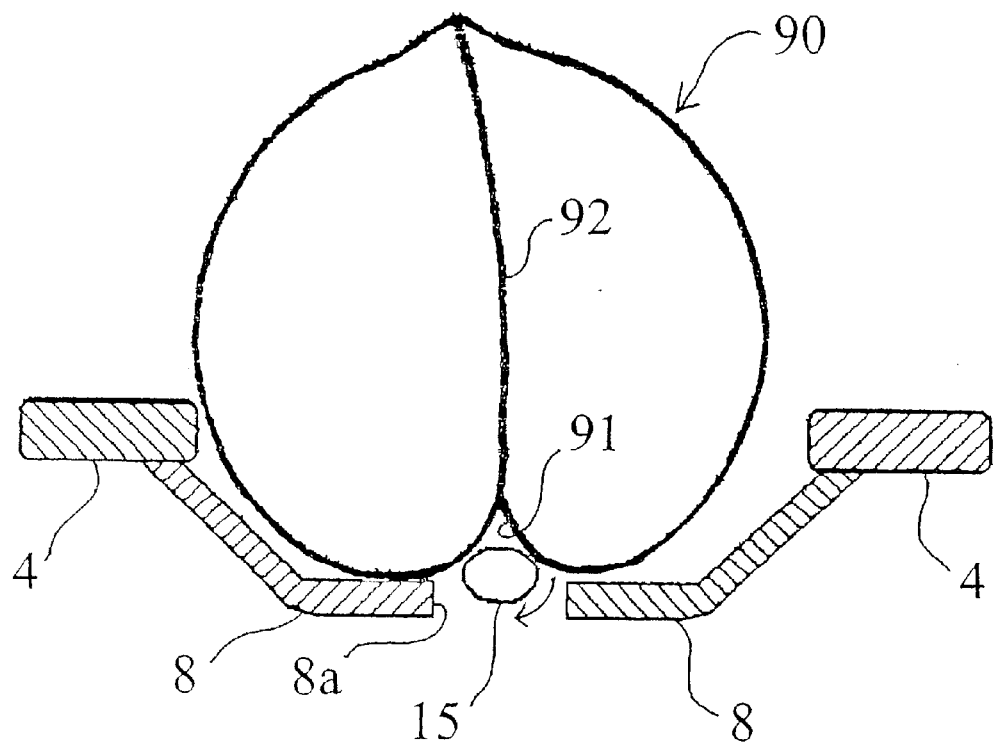
FIG. 3B shows the prior art aligner of FIG. 3A wherein the properly sized peach has been aligned and is ready for pitting.
Figure 5:
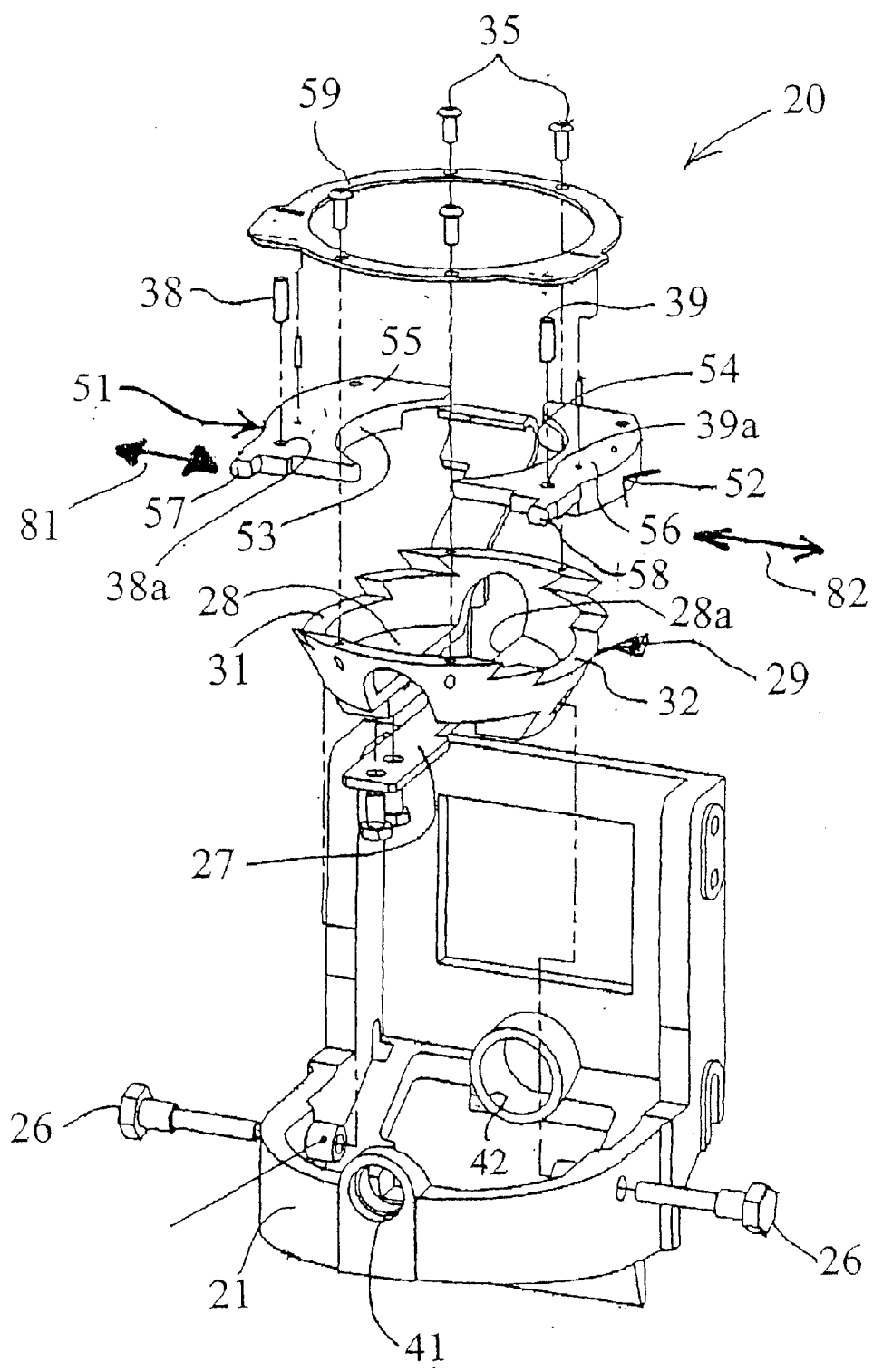
FIG. 5 is a perspective, exploded view showing an adjustable aligner cup assembly according to the present invention.

FIGS. 3A and 3B are schematic representations of how the prior art aligner 10 of FIGS. 1 and 2 with a medium sized fixed ring 4 interacts to align a medium sized peach 90. FIG. 3A illustrates the stem cavity 91 of the peach positioned upwardly; suture line 92 is shown extending from stem cavity 91 to the blossom end 93. The blossom end 93 of the peach shown in FIG. 5 is being agitated by eccentric spindle 15. Spindle 15 cooperates with rocking arm 11 (see FIG. 2) to agitate and cause peach 90 to rotate. As peach 90 is being rotated, it ordinarily remains in contact with eccentric spindle 15 and is in contact with a portion of the fixed, circular alignment ring 4, as shown in FIG. 3A. The purpose of alignment ring 4 is to limit and contain lateral motion of peach 90 and to keep peach 90 in contact with eccentric spindle 15 until proper alignment has been achieved. The peach 90 is agitated and caused to rotate while eccentric spindle 15 "hunts" for stem cavity 91.

FIG. 3B schematically illustrates how the medium sized peach 90 shown in FIG. 3A has become properly oriented and supported for the pitting operation. The stem cavity 91 as shown in FIG. 3B is now oriented in a downward direction and the suture line 92 is aligned with the longitudinal axis X—X (FIG. 1) of eccentric 15. When this alignment has been reached, the peach 90 "settles down" and is no longer agitated by spindle 15. In the position shown in FIG. 3B, the weight of the aligned peach 90 is carried by the base 8 of cup assembly 10 either alone or with alignment ring 4. The eccentric 15 is still rotating within stem cavity 91 but no longer agitates and rotates the aligned peach 90 shown in FIG. 3B.

Figure 4A:
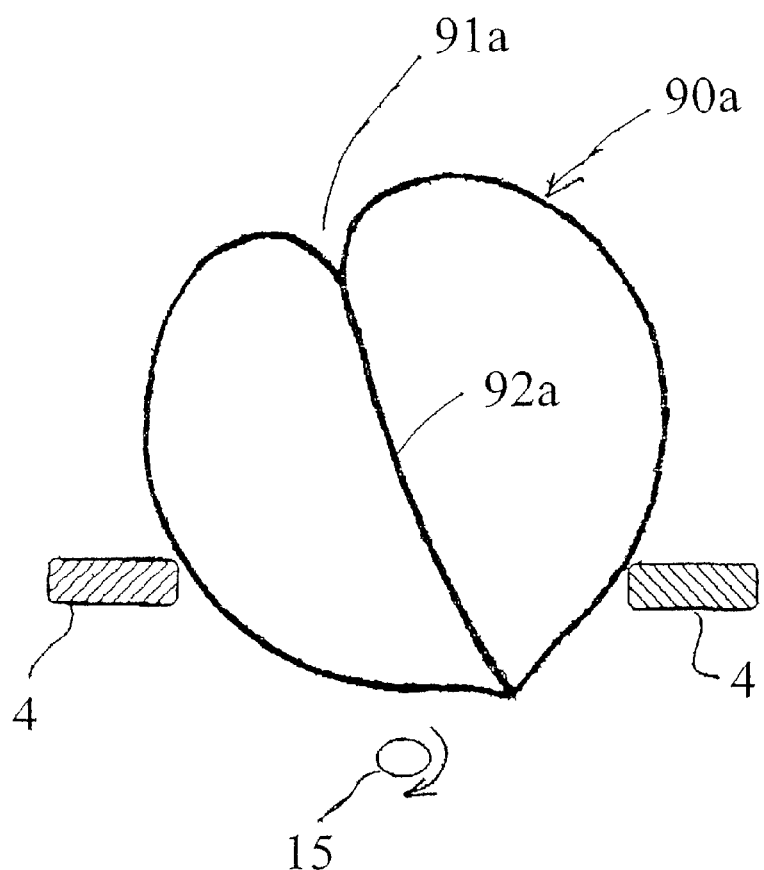
FIG. 4A is a schematic illustration showing the prior art fixed ring aligner of FIGS. 3A and 3B showing how that fixed ring aligner is unable to properly align an oversized or large peach.
Figure 4B:
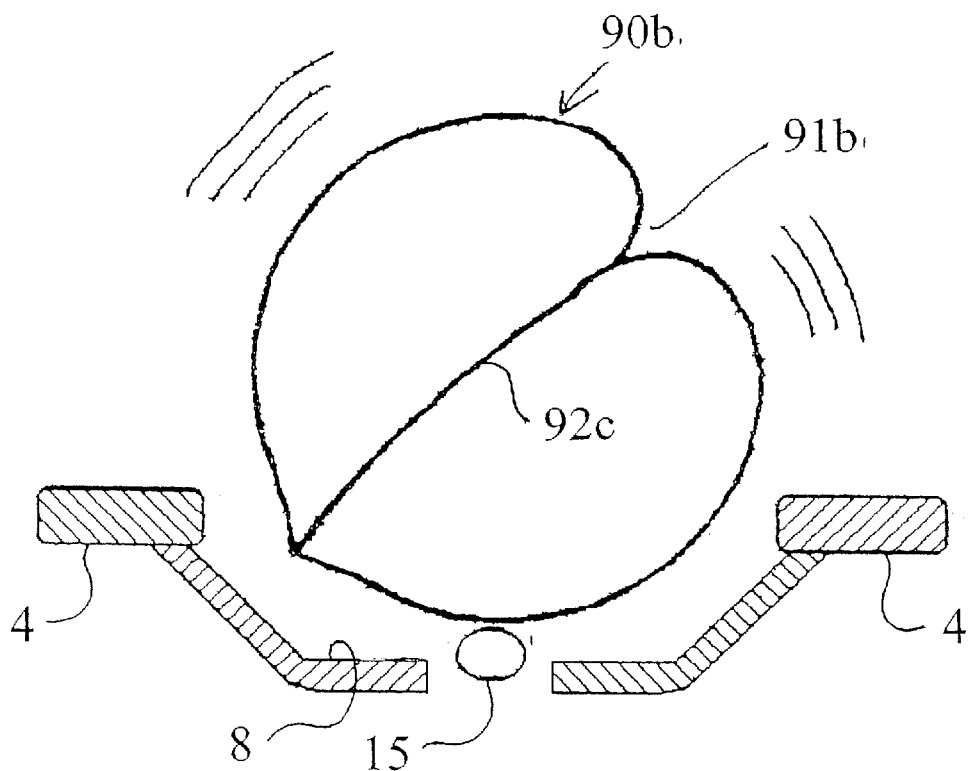
FIG. 4B shows the fixed ring aligner of FIGS. 3A and 3B showing how an undersized or small peach does not become properly aligned by that mechanism.

FIGS. 4A and 4B are schematic representations of two common problems mentioned above which are faced by the prior art peach aligner shown in FIGS. 1–3. The problems illustrated in these FIGS. 4A, 4B are overcome by the present invention.

FIG. 4A illustrates the medium sized alignment ring 4 shown in FIGS. 1–3B. However, FIG. 4A illustrates a large peach 90a presented to the prior art alignment cup fitted with medium sized ring 4. The large peach 90a sits on alignment ring 4, considerably higher than medium sized peach 90 shown in FIGS. 3A and 3B. The large peach 90a does not extend downwardly beneath ring 4 a sufficient distance to be agitated by eccentric spindle 15. Peach 90a is shown in a misaligned position with its stem cavity 91a oriented upwardly but inclined to a vertical axis approximately 20°. Peach 90a in this position will not be pitted properly and will have to become downgraded at considerable financial cost to the canner. Since peach 90a is misaligned, it will not be cut along its suture line 92a, and will have to be downgraded and diced for fruit cocktail; whereas if it were aligned properly, it would be suitable for canning as peach halves. Furthermore, since the pit of peach 90a is also misaligned, it is likely that pit fragments will remain after the pitting operation. Removing the pit fragments adds costs to the processing and often requires "spooning," which removes much of the otherwise usable flesh around the pit. Finally, any pit fragments not detected and removed represent significant potential problems for the canner if they cause any personal injury to consumers.

FIG. 4B illustrates a small peach 90b being presented to the prior art aligner of FIG. 4A fitted with the same medium alignment ring 4. Small peach 90b slips downwardly between the edges of medium alignment ring 4, rides on eccentric spindle 15 and usually does not "settle down" on the base 8 of cup assembly 10. The small peach 90b shown in FIG. 4B will probably be misaligned during the pitting operation. As a consequence, it will be downgraded, at considerable cost to the canner. In addition, pit fragments will probably also remain after pitting of misaligned peach 90b.

The present invention overcomes the problems illustrated in FIGS. 4A and 4B by adjusting the size of a novel multi-piece alignment ring to fit the size of the specific peach about to be aligned.

Figure 6:
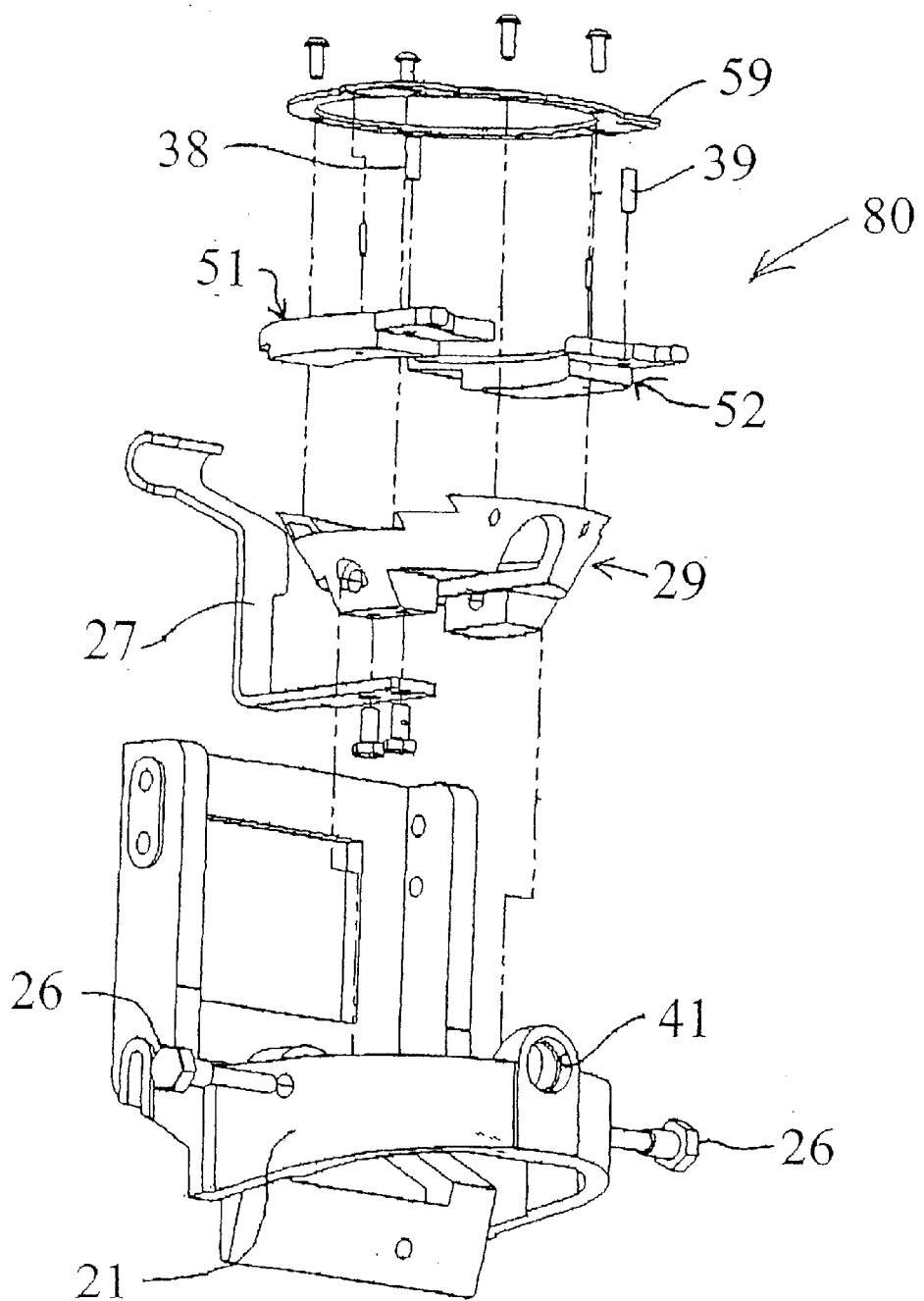
FIG. 6 is a different perspective, exploded view of the adjustable aligner cup assembly illustrated in FIG. 5.
Figure 7:
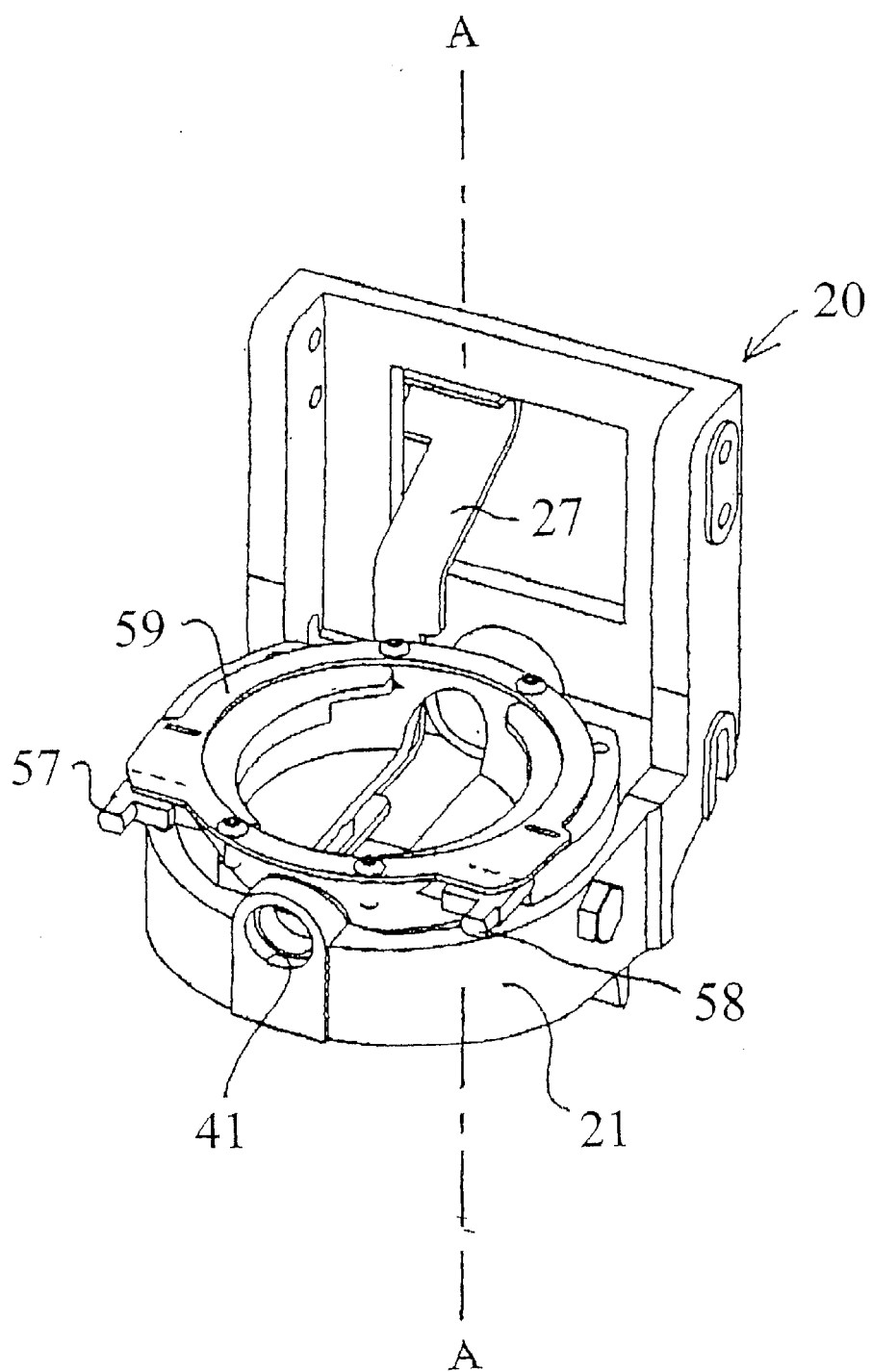
FIG. 7 is a perspective view of the aligner cup assembly shown in FIGS. 5 and 6 in its assembled form.

FIGS. 5–7 illustrate an adjustable aligner cup assembly 20 according to the present invention configured to adjust to three different positions, corresponding to the three different fixed ring sizes used in typical prior art aligners for small, medium and large peaches. The present invention allows the aligner cup to be adjusted to a variety of different sizes, and is not limited to using prior art fixed ring dimensions. FIGS. 5 and 6 are exploded assembly drawings shown in perspective view. FIG. 7 shows the parts assembled. Aligner cup 29 is pivotally mounted on a two part, cup pivot stud 26,26; aligner cup 29 is therefore free to oscillate. Cup pivot stud 26,26 is affixed to cup holder 21. Aligner cup 29 lies in a horizontal plane perpendicular to vertical axis A—A (see FIG. 7) during the alignment process. Cup rocking arm 27 is connected to aligner cup 29 and, working together with an eccentric spindle (not shown in FIGS. 5–7 for clarity), provides a rocking motion known in the art and described above to agitate the peach until it is aligned properly relative to its suture line and stem cavity. Cup assembly 20 has a base 28 with an elongated slot 28a formed therein in which an eccentric spindle (not shown) rotates. An eccentric spindle (not shown) extends between holes 41 and 42 in cup holder 21. The eccentric spindle rotates against the bottom of the peach, helping to turn and agitate the peach. As this turning and agitation takes place, the edges of the peach contact the edges of first and second adjustable alignment ring segments 51 and 52 described below. The peach turns on the spindle until the stem cavity of the peach is pointing downwardly and adjacent the spindle. The peach rotates slightly until its suture line is aligned with the longitudinal axis of the spindle and the stem cavity points downwardly and is adjacent the spindle. At this point, the peach "settles down," since the lobe of eccentric spindle may contact the peach, but does not agitate it; the peach is now aligned for pitting. The lobe of the eccentric spindle is shaped similar to the shape of the peach stem cavity, so that when the peach is aligned, the eccentric spindle no longer agitates it.

The pair of movable alignment ring segments 51 and 52 is slidably carried by aligner cup 29. Movable ring segments 51 and 52 form an "adjustable alignment ring means." Ring segments 51 and 52 each has an arcuate peach contact edge 53 and 54, respectively. Each edge 53 and 54 subtends an arc slightly less than 180°. Segments 51 and 52 have upper surfaces 55 and 56 which are coplanar. Segments 51 and 52 are adjustable by moving in the plane of their upper surfaces 55 and 56 to various positions wherein the peach contact edges 53 and 54 are spaced a selected diametrical distance apart. Edges 53 and 54 are continuously adjustable to form diameters of, for example, 2.375, 2.625 and 2.875 inches, corresponding to small, medium, and large peaches. Other diameters may be utilized and segments 51 and 52 can be continuously adjustable to more than three diameters.

Movable segments 51 and 52 are mounted in and slidably carried by recesses 31 and 32, respectively, formed in the upper surface of aligner cup 29. Recesses 31 and 32 form mounting means carried by aligner cup assembly 20 for slidably supporting segments 51 and 52. In accordance with the preferred embodiment of the present invention, adjustable segments 51 and 52 are independently driven either toward each other or away from each other to decrease or increase the working diameters of contact edges 53 and 54. This adjustment is accomplished by providing lugs 57 and 58 at the outer ends of segments 51 and 52, respectively, i.e., the ends that extend away from the conveyor chain that carries cup holder 21. Lugs 57 and 58 are either driven toward each other or away from each other, as indicated by arrows 81 and 82. As lugs 57 and 58 move, segments 51 and 52 slide in recesses 31 and 32 of aligner cup 29. A top retainer ring 59 is connected to cup 29 by four connectors 35. Two ball plungers 38 and 39 are carried by holes or recesses 38a and 39a in adjustable segments 51 and 52, respectively. Ball plungers 38 and 39 seat in depressions formed in the bottom surface of retainer ring 59. Three depressions may be formed in the bottom surface of retainer ring 59 to achieve and hold the desired working diameters for movable segments 51 and 52.

Figure 8:
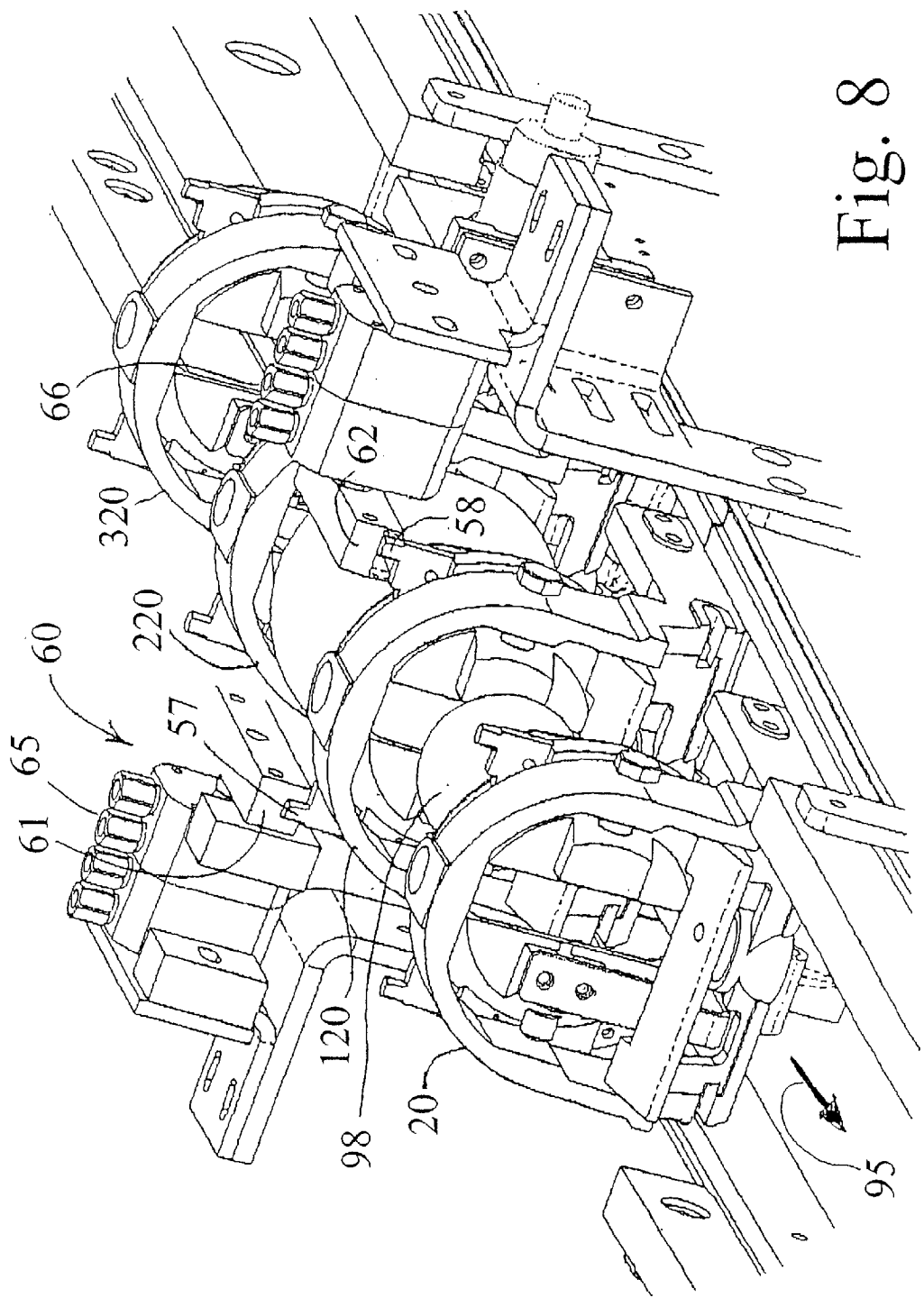
FIG. 8 is a perspective view illustrating the actuation mechanism for adjusting the size of the aligner cup assemblies according to the present invention.

FIG. 8 illustrates how lugs 57 and 58 are driven. FIG. 8 is a partially broken away view of four cup assemblies 20,120,220 and 320 moving past an adjustment station shown generally as 60. Cup assembly 120 has lugs 57 and 58 in contact with elongated guide tracks 61 and 62, respectively. Guide tracks 61 and 62 have elongated channels through which lugs 57 and 58 pass, the channels in guide tracks 61 and 62 being tapered and larger in width than lugs 57 and 58. Guide tracks 61 and 62 are movable in a direction perpendicular to the direction of travel of the conveyor, shown by arrow 95. By so moving, guide tracks 61 and 62 either move lugs 57 and 58 toward each other or away from each other. Movable guide tracks 61,62 form "movable guide means." Guide tracks 61 and 62 are driven by drive means which comprise air cylinder pairs 65 and 66. Each air cylinder pair includes two cylinders butted together. Lugs 57,58, guide tracks 61,62 and air cylinders 65,66 together form an "actuator means."

The air cylinders in this embodiment operate in response to an optical-sensor 80 (see FIG. 9) which senses the diameter of a specific peach about to be placed on a given, specific cup assembly. Instead of an optical sensor, either a proximity sensor, mechanical sensor, ultra-sonic sensor or other type sensor could be utilized to sense the peach size.

It is also within the scope of the invention to adjust the size of the adjustable aligner cup assemblies either manually or automatically in response to a sensor that detects the average size of a batch of incoming peaches. For example, a sensor may be placed near a merry-go-round which carries a batch of incoming peaches; the sensor would measure total weight or average outer diameter, for example. If the incoming batch of peaches is "small," the aligner cup assemblies would be adjusted to a small size for a set period of time or for a set number of cycles.

Figure 9:
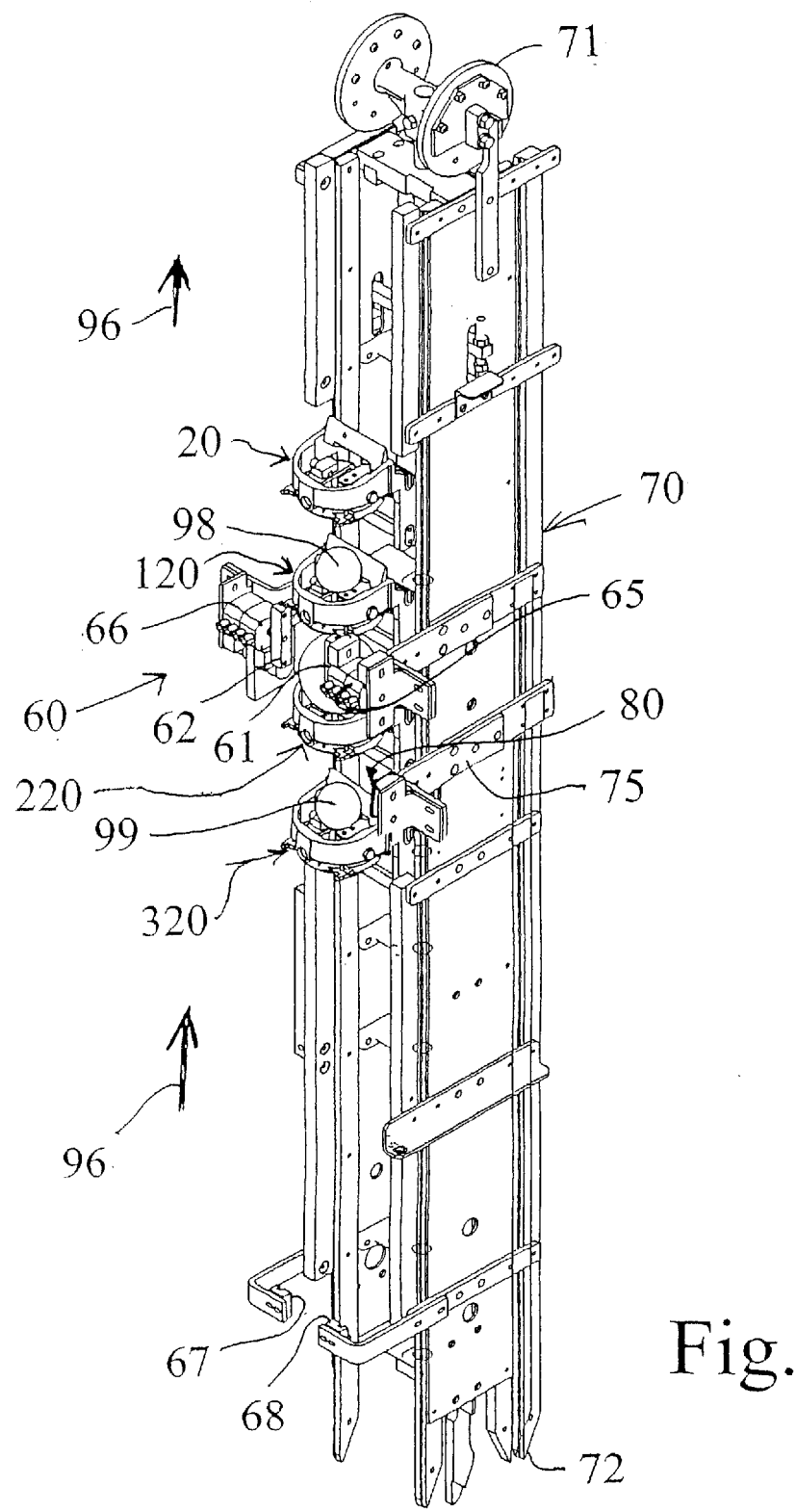
FIG. 9 is a perspective view showing the framework of the peach aligner apparatus carrying a plurality of adjustable aligner cups according to the present invention.

FIG. 9 is a perspective view, partially broken away for clarity, illustrating adjustment station 60 in the environment of the frame 70 of the peach aligner and pitting apparatus to which the present invention pertains. The four cup assemblies 20,120,220 and 320 of FIG. 8 are shown moving upwardly on a conveyor chain (not shown) carried by frame 70. The chain moves upwardly and travels over the top 71 of frame 70 and around the bottom 72 of frame 70 in endless fashion. Only four cup assemblies are illustrated in FIG. 9 for clarity. As a practical matter, cup assemblies are equally spaced all around frame 70. The four cup assemblies illustrated in FIG. 9 are moving upwardly in the vertical direction illustrated by arrows 96. The four cup assemblies illustrated are upside down and, when they pass over the top 71 of conveyor frame 70, they become oriented right side up, as illustrated in FIGS. 5–7. Peach 98 is shown being carried upwardly on the bottom of cup assembly 120. Peach 98 will be dropped onto the upper side of cup assembly 20 as both cup assemblies pass over the top 71 of conveyor 70. Peach 98 will be aligned on cup assembly 20 as it moves downwardly on the righthand side of conveyor frame 70. As cup assembly 20 approaches the bottom 72 of frame 70, the peach is removed from cup assembly 20 and pitted. Cup assembly 20 has approximately ten seconds to align peach 98 as it moves downwardly on the righthand side of frame 70.

Peach 98 in its position shown in FIG. 9 has just moved upwardly passed adjustment station 60. Station 60 adjusts cup 20 to its proper size to align peach 98.

An optical sensor 80 is mounted on bracket 75, upstream of adjustment station 60 and air cylinders 65 and 66 relative to motion of peaches 98 and 99. As shown in FIG. 9, peach 99 is on the bottom of cup assembly 320, moving upwardly and is about to pass in front of optical sensor 80. Optical sensor 80 will sense the size of peach 99 prior to cup assembly 220 entering station 60. Station 60 adjusts cup assembly 220 to the proper size for peach 99. As peach 99 rides over the top 71 of conveyor 70, it drops onto the top of cup assembly 220, which has been adjusted to a proper size to align peach 99.

Near the bottom 72 of conveyor frame 70 are reset guide tracks 67 and 68. The purpose of reset guide tracks 67 and 68 is to reset lugs 57 and 58 to a desired default position after a peach has been removed from the cup assembly for pitting. Reset guide tracks 67 and 68 are tapered and form "default setting means." For example, if conveyor 70 is expected to handle medium size peaches, reset guide tracks 67 and 68 will have a default position for medium peaches. Lugs 57 and 58 of the cup assemblies will be changed from the default position at sensing and adjustment station 60 only if the peach being sensed is of a size different than the default setting, i.e., small or large. The adjustment is made by drive means or air cylinder pairs 65 and 66 moving adjustment guide tracks 61,62 either toward each other for a small peach or away from each other for a large peach. If, for example, lugs 57 and 58 are moved away from each other by adjustment guide tracks 61,62 to align a large peach, the lugs 57 and 58 will be held in that position by ball plungers 38 and 39 to align the large peach. When lugs 57 and 58 reach reset guide tracks 67 and 68, they will be reset to the default position in this case which is for medium size peaches. The default position can alternately be set for large or small peaches, or for other intermediate sizes.

FIGS. 8 and 9 have illustrated the cup assemblies moving vertically, upwardly and downwardly, on conveyor frame 70. It is also within the scope of the invention to place cup assemblies on a horizontal table, known in the art, and transport the peaches horizontally through a circular pathway using the adjustable cup design of the present invention.

Variations in design may be made without departing from the invention. For example, rather than move both adjustable rings, it is possible, but less preferred, to move only one ring. The disadvantage of having one movable ring and a fixed ring is that symmetry relative to the spindle is lost, and the orienting efficiency is decreased. Another variation is to pivotally connect each adjustable ring to the aligner cup at the end of each ring that lies opposite the lugs 57 and 58. However, such variation also loses symmetry relative to the spindle, and orienting efficiency declines. Instead of using air cylinders to actuate adjustment guide tracks 61 and 62, hydraulic cylinders, electrically actuated solenoids or other actuators may be used for that purpose.

Figure 10:
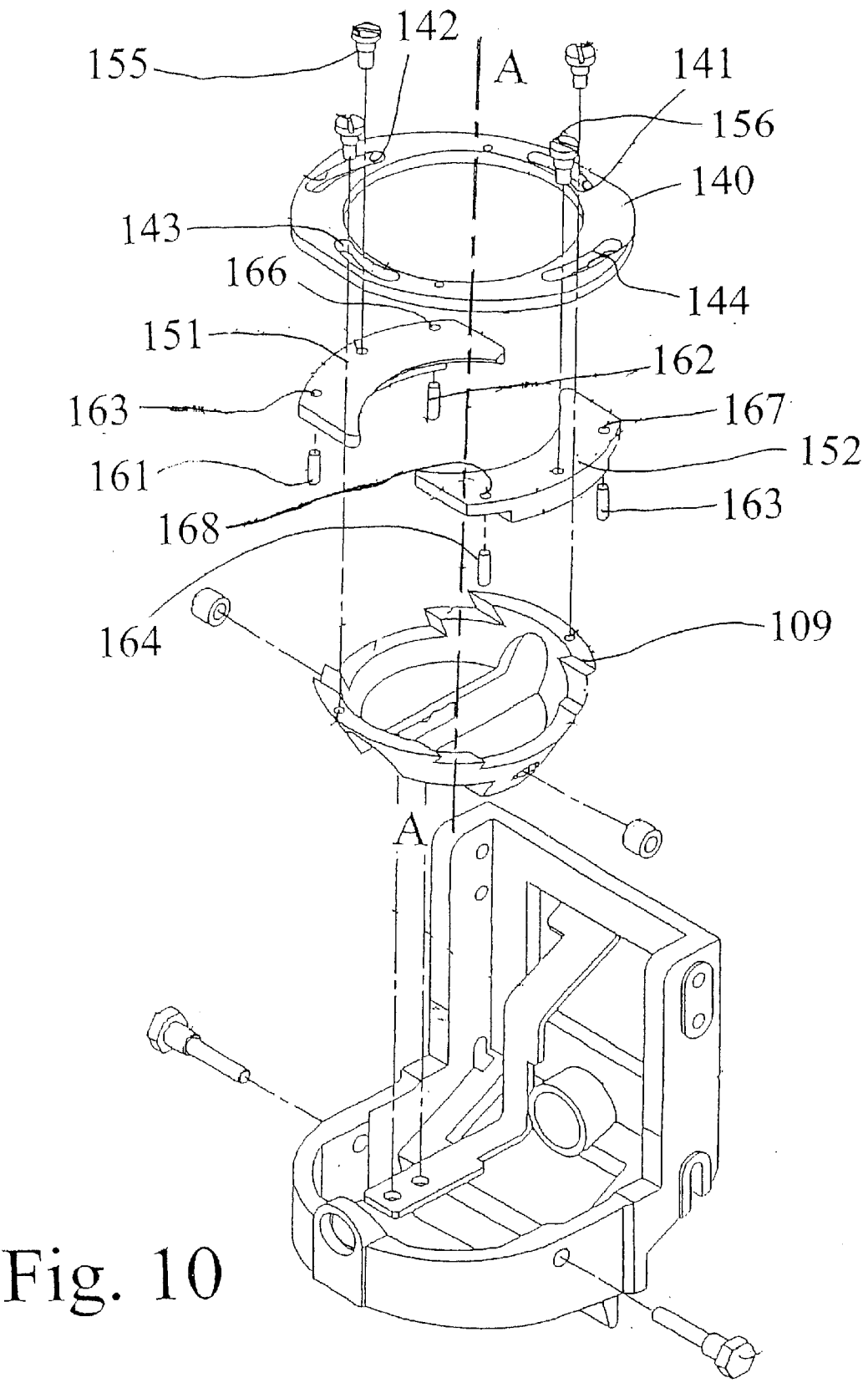
FIG. 10 is a perspective, exploded view of an alternate embodiment of the invention.
Figure 11:
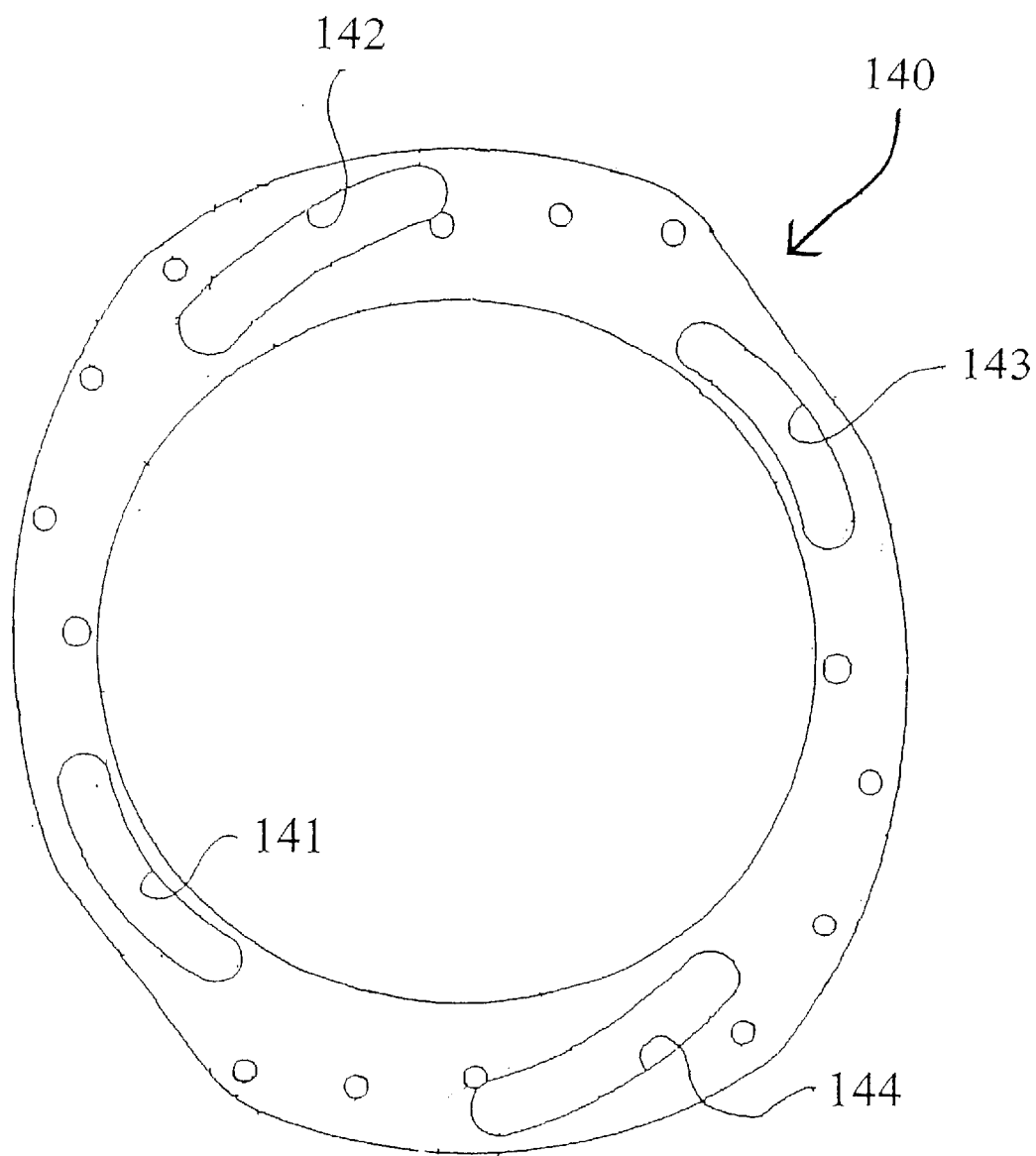
FIG. 11 is a plan view of one member of the device shown in FIG. 10.

FIGS. 10 and 11 illustrate a second embodiment of the invention. In this embodiment, first and second movable alignment ring segments 151 and 152 are slidably carried by aligner cup 109 in the same fashion as illustrated in the embodiment shown in FIGS. 5–7. However, in the embodiment shown in FIGS. 10 and 11, motion of first and second segments 151 and 152 is caused by rotation of an actuation ring 140. Actuation ring 140 is positioned immediately above and adjacent to movable ring segments 151 and 152 and has two camming grooves 142,144 formed therein.

Grooves 141,143 are radial retaining grooves. Camming grooves 142 and 144 cause segments 151 and 152 to move as ring 140 is rotated. As ring 140 is rotated, camming surfaces in camming grooves 142 and 144 contact cam follower lugs 155 and 156 which extend through camming grooves 142,144 and are rigidly connected to movable segments 151 and 152.

An array of four ball plungers 161–164 is used to hold or secure movable ring segments 151 and 152 to be desired different positions corresponding to small, medium and large peaches. Ball plungers 161–164 extend upwardly through holes 165–168 in segments 151 and 152 and are fixed to segments 151 and 152 by threading or otherwise. The upper ends of ball plungers 161–164 seat in recesses formed in the bottom surface of camming ring 140. Circular recesses formed in the bottom of camming ring 140 interact with ball plungers 161–164 to maintain the proper diametrical spacing between the peach contact edges of first and second movable segments 151 and 152.

Rotation of camming ring 140 in a clockwise direction in FIG. 10 about axis A—A causes the camming surfaces of camming grooves 142 and 144 to drive cam follower lugs 155 and 156 to a greater or increased diametrical position with respect to axis A—A. This causes first and second movable segments 151 and 152 to slide outwardly away from each other in a direction perpendicular to vertical longitudinal axis A—A. Conversely, rotation of the camming ring 140 in a counterclockwise direction shown in FIG. 10 causes first and second movable segments to move closer to each other as would be necessary for aligning smaller peaches. The sliding motion of movable segments 151 and 152 is a smooth action in a plane perpendicular to vertical axis A—A and in a plane parallel to the upper surfaces of movable segments 151 and 152.

Figure 12:
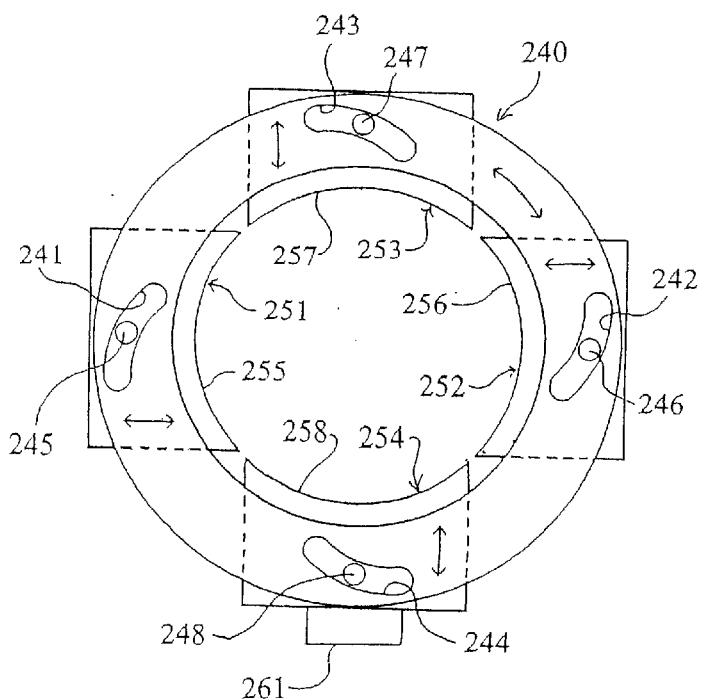
FIG. 12 is a schematic representation of another embodiment of the invention.
Figure 13:
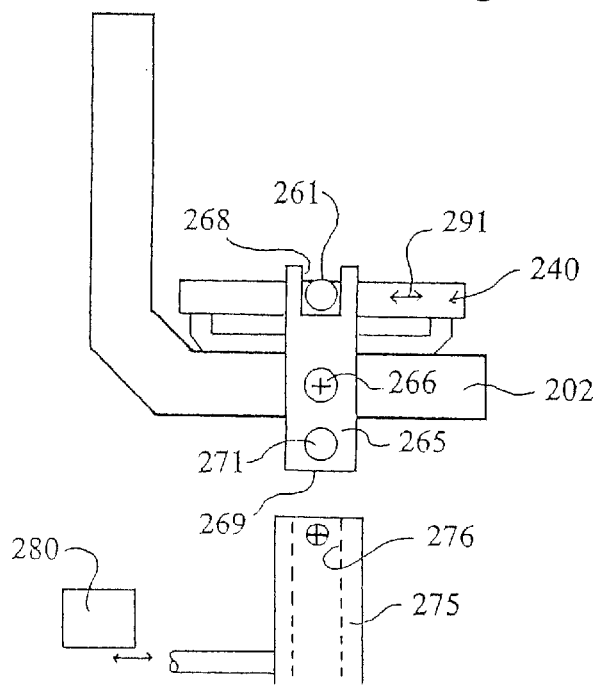
FIG. 13 is a side elevational view showing how the embodiment illustrated in FIG. 12 is mounted to an aligner cup assembly.

FIGS. 12 and 13 illustrate a third embodiment of the invention. In this embodiment, four movable alignment ring segments 251–254 are utilized, wherein each segment has a peach contacting edge 255–258, respectively, that subtends an arc slightly less than 90°. The four segments 251–254 form an "adjustable alignment ring means." A camming ring shown generally as 240 is a circular ring slidably mounted above multiple segments 251–254 and which may be rotated either clockwise or counterclockwise from the position illustrated in FIG. 12. The four camming grooves 241–244 are formed in camming ring 240. The camming surfaces of grooves 241–244 drive cam followers 245–248 which are connected to movable ring segments 251–254, respectively. Rotation of camming ring 240 in the clockwise direction will move ring segments 251–254 to a larger working diameter for aligning larger peaches. Conversely, rotation of camming ring 240 in the counterclockwise direction, as shown in FIG. 12, causes ring segments 251–254 to move toward a smaller diametrical working distance for aligning smaller peaches.

FIG. 13 illustrates an actuator for camming ring 240. The actuator includes a cam follower 261 carried by camming ring 240. A pivoting actuation arm 265 is pivotally connected to cup holder 202 at pivot point 266. Pivoting arm 265 at its upper end has a recess 268 formed which engages cam follower 261. As pivoting actuation arm 265 rotates around pivot point 266, camming ring 240 is rotated in either direction as indicated by arrow 291. Pivot arm 265 carries an actuation lug 271 near its lower end 269. An actuator 275 has a recess 276 that engages lug 271. A drive means 280 shown in block form may be an air cylinder which causes actuator 275 to be moved to the left or right as illustrated in FIG. 13 to cause rotation of camming ring 240.

It is within the scope of the invention to use different numbers of movable segments; for example, 3 segments could be utilized or more than 4 segments may be utilized.

FIGS. 14–19 illustrate various actuator means that may be utilized to cause movement of the movable alignment ring segments.

Figure 14:
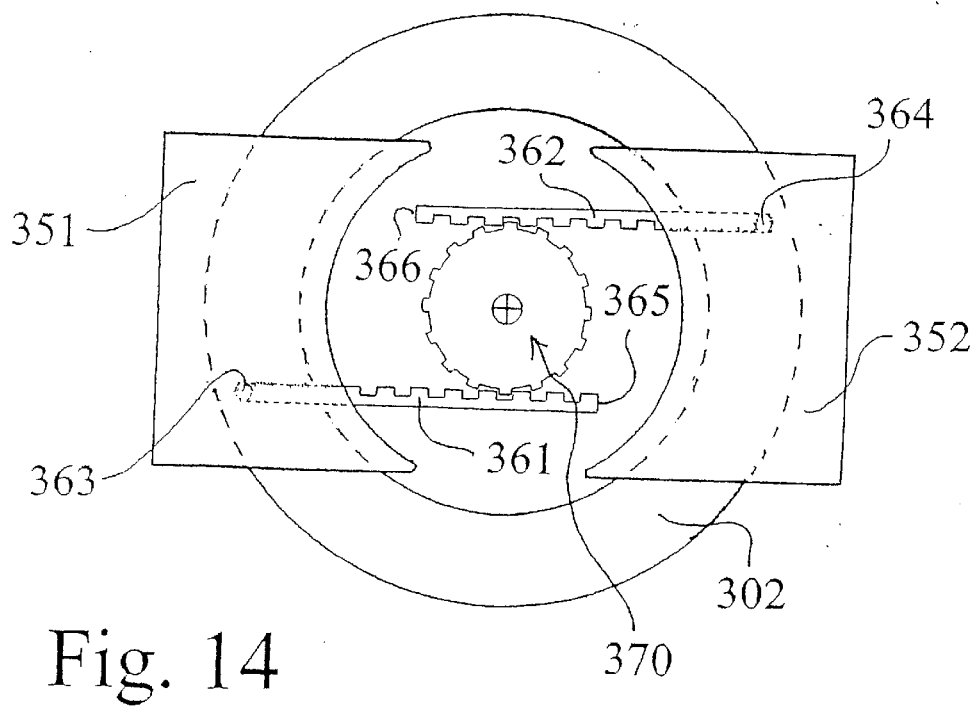
FIG. 14 is a schematic representation of yet another embodiment of the invention, shown as a plan view.
Figure 15:
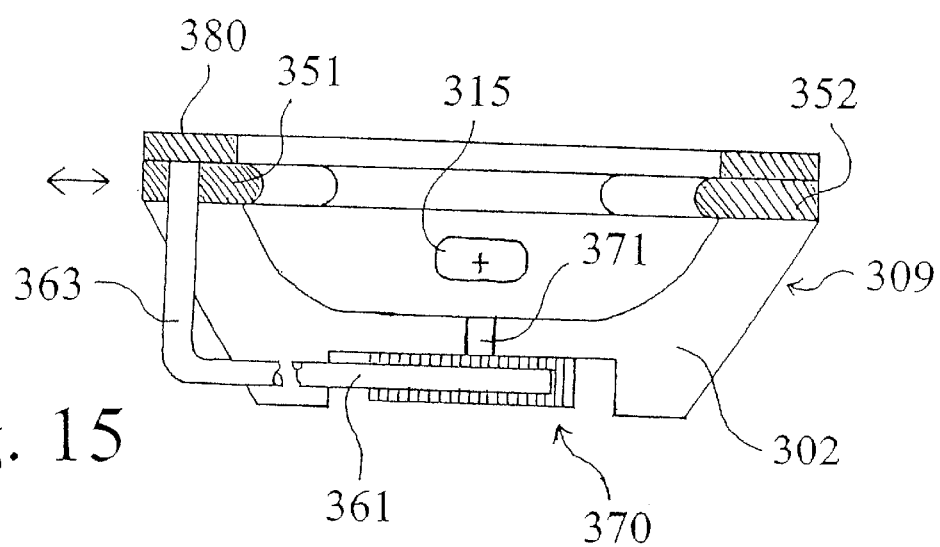
FIG. 15 is a side elevational view, shown partially in section, illustrating how the embodiment of FIG. 14 is carried by an aligner cup assembly.

FIGS. 14 and 15 illustrate a fourth embodiment wherein first and second movable alignment ring segments 351 and 352 are connected to first and second rack gears 361 and 362, respectively, by pins 363 and 364. A pinion gear 370 is positioned between the free ends 365 and 366 of rack gears 361 and 362, respectively. Rotation of pinion gear 370 in the clockwise direction illustrated in FIG. 14 causes first and second segments 351 and 352 to move to a larger diametrical working distance for aligning larger peaches. Conversely, rotation of the pinion gear 370 in the counterclockwise direction illustrated in FIG. 14 causes the movable segments 351 and 352 to move closer together, reducing the diametrical distance between the peach contacting edges of each movable segment 351 and 352 as required for properly aligning smaller peaches.

FIG. 15 is a side elevational view, partly in section, illustrating how movable segments 351 and 352 are caused to move. Pinion gear 370 is carried by cup 302 by a mounting shaft 371. FIG. 15 also illustrates rack gear 361 connected via pin 363 and how it interacts with pinion gear 370 and movable ring segment 351. FIG. 15 also illustrates the eccentric spindle 315 which agitates the peach being aligned. FIG. 15 also illustrates a top ring retainer 380 which rides adjacent to and on top of movable segments 351 and 352 to stabilize the motion of segments 351 and 352. The ring retainer 380 is not illustrated in FIG. 14 for the purpose of clarity.

Figure 16:
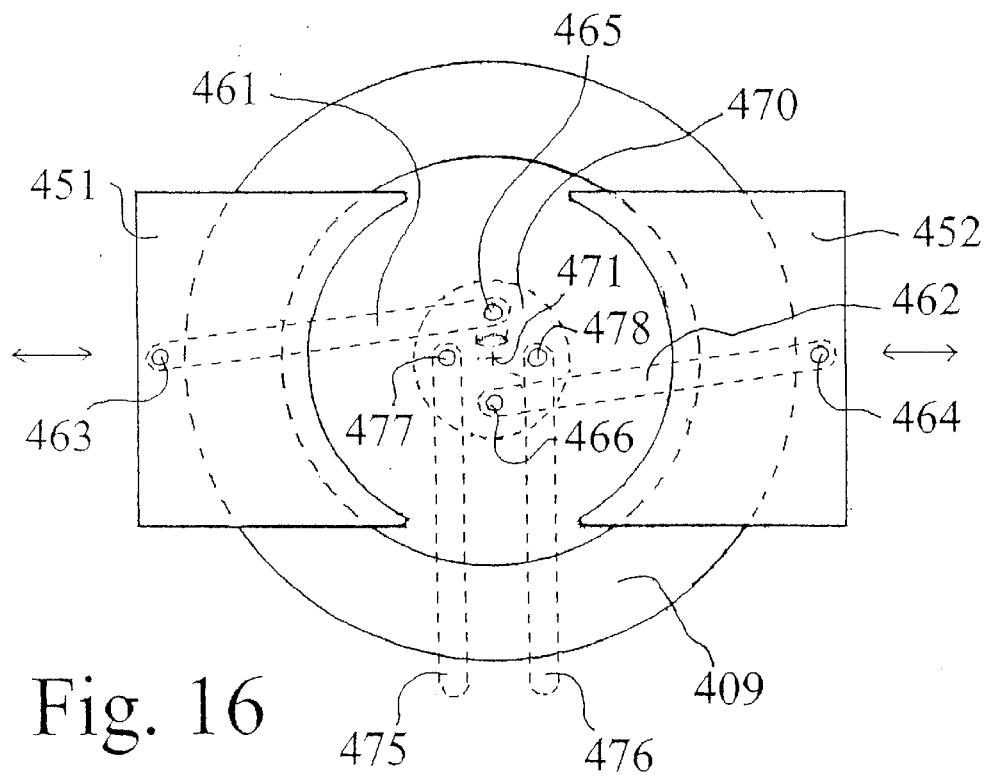
FIG. 16 is a schematic representation of yet another embodiment of the invention, shown as a plan view.
Figure 17:
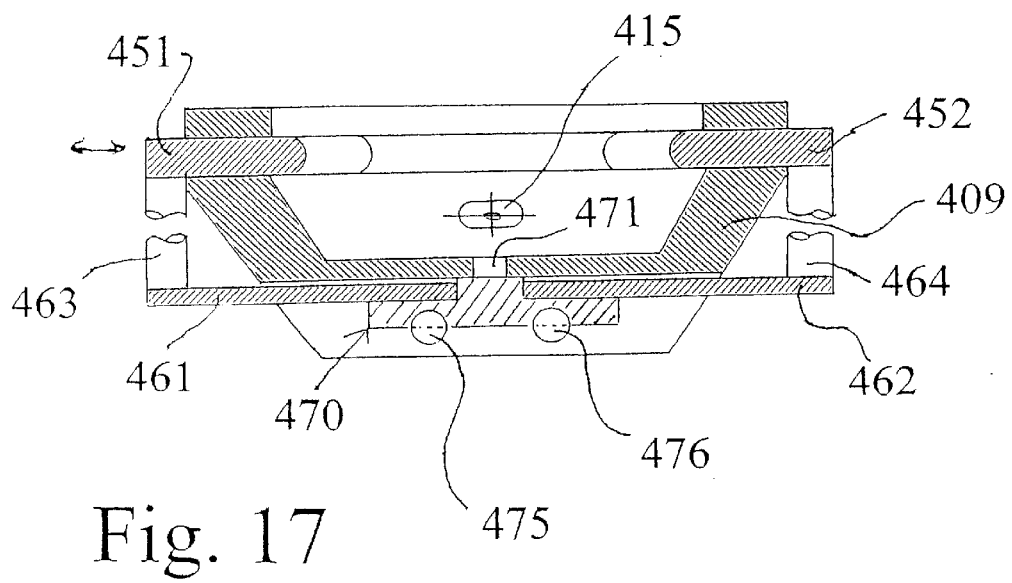
FIG. 17 is a side elevational view, shown partially in section, illustrating how the embodiment of FIG. 16 is carried by an aligner cup assembly.

FIGS. 16 and 17 illustrate a fifth embodiment of the invention. In this embodiment, a pair of movable segments 451 and 452 are mounted for slidable motion with respect to aligner cup 409. Movement of segments 451 and 452 is caused by a pair of linkage arms 461 and 462 which are each pivotally connected at one end to movable segments 451, 452 by pins 463 and 464, respectively. The opposite or second end of linkage arms 461 and 462 are pivotally connected to an idler wheel 470 mounted for pivotal rotation on 471. Linkage arms 461 and 462 are pinned to idler wheel 471 by pins 465 and 466, respectively. Rotation of idler wheel 470 in the clockwise direction illustrated in FIG. 16 will cause segments 451 and 452 to move closer to each other for aligning smaller peaches. Conversely, rotation of idler wheel 470 in the counterclockwise direction will cause segments 451 and 452 to move apart from each other for aligning larger peaches.

Rotation of idler wheel 470 is caused by linkage arms 475 and 476 which are pinned to idler wheel by pins 477 and 478, respectively. Idler wheel 470 is caused to rotate in a clockwise direction by causing linkage arm 475 to move in a direction towards idler wheel 470. Rotation of idler wheel 470 in the counterclockwise direction is caused by driving linkage arm 476 toward idler wheel 470.

FIG. 17 illustrates placement of the linkage arms shown in FIG. 16. Linkage arms 461 and 462 are positioned below movable segments 451 and 452 and connected to each of those segments by vertically extending pins 463 and 464, respectively. Idler wheel 470 is rotatably mounted to the bottom of aligner cup 409 by a mounting shaft 471.

Figure 18:
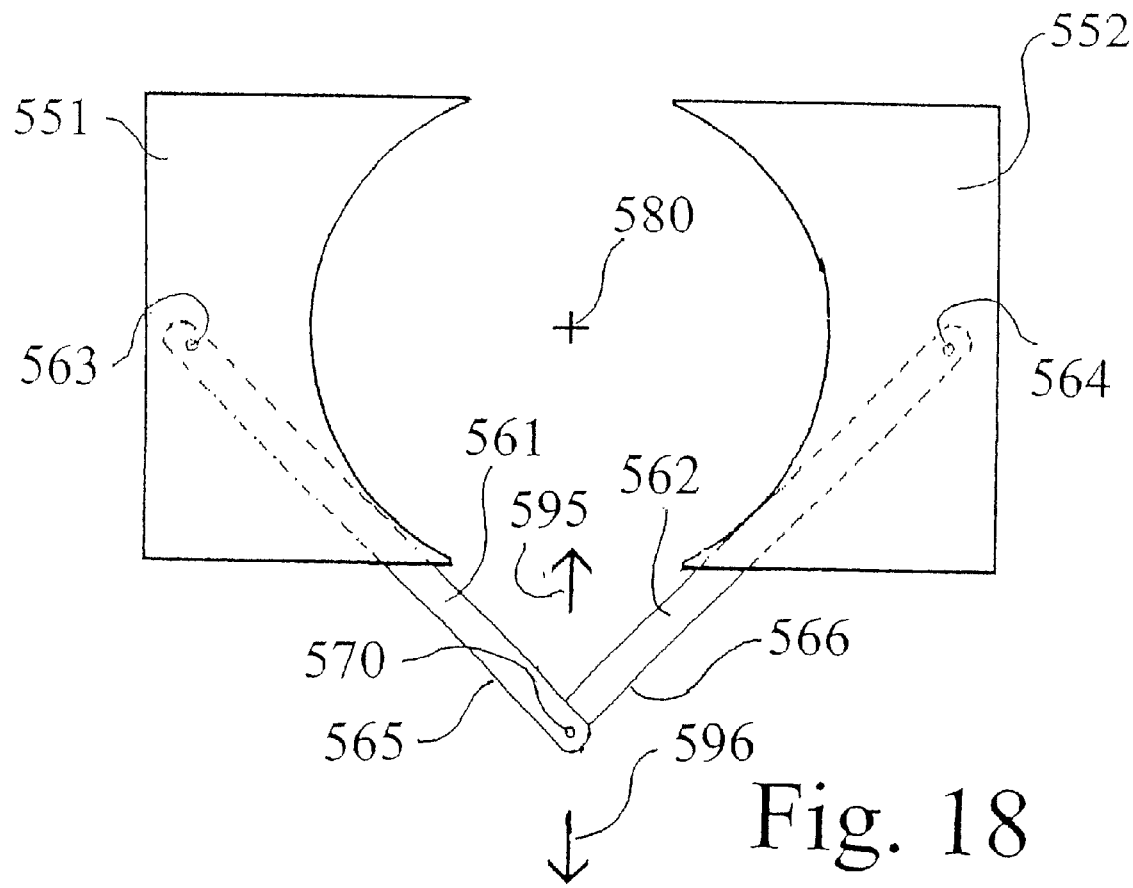
FIG. 18 is a schematic representation of yet another embodiment of the invention, illustrated as a plan view.

FIG. 18 illustrates a sixth embodiment of the invention. In this embodiment, movable segments 551 and 552 are again slidably mounted in slots formed in the aligner cup (not shown for clarity). Two linkage arms 561 and 562 are each pivotally connected to movable segments 551 and 552 by pins 563 and 564, respectively. The opposite ends or free ends 565 and 566 of linkage arms 561 and 562, respectively, are pinned together by a pin 570. The movable segments 551 and 552 are caused to move by pushing connecting pin 570 either in a horizontal direction, shown by arrow 595, toward the center 580 of ring segments 551 and 552 for aligning larger peaches. Conversely, the connecting pin 570 may be moved away from the center 580 of movable rings 551 and 552 in a horizontal direction, as shown by arrow 596, to move the segments 551 and 552 together for aligning smaller peaches.

Figure 19:
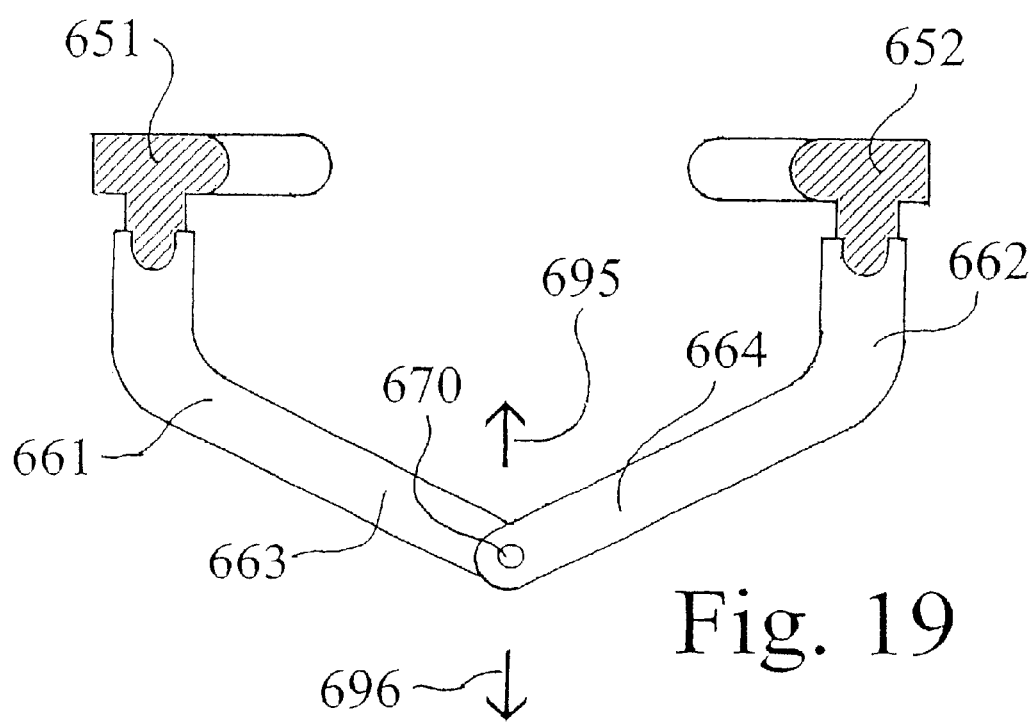
FIG. 19 is a schematic representation, shown in a side elevational view, partially in section, illustrating a further embodiment of the invention.

FIG. 19 illustrates a seventh embodiment of the invention. Movable segments 651 and 652 are slidably mounted in slots formed in the aligner cup (not shown for clarity). Two linkage arms 661 and 662 are pivotally connected to segments 651,652, respectively. The opposite ends or free ends 663,664 of arms 661,662 are pinned together by pin 670. Segments 651,652 are moved away from each other by moving pin 670 upwardly as shown by arrow 695. Segments 651,652 are moved toward each other by moving pin 670 downwardly as shown by arrow 696. Alternately, linkage arms 661,662 may be rotated in opposite directions about pin 670 to cause relative motion by segments 651,652.

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. In an automatic peach aligning and pitting mechanism wherein a plurality of aligner cup assemblies is provided for transporting peaches through the alignment and pitting processes, and each of said assemblies has an alignment ring for contacting a peach, and wherein each of said alignment rings is utilized together with an agitator to cause said peach to rotate until the suture line of said peach is aligned for pitting, the improvement characterized by:

an adjustable alignment ring means carried by each of said aligner cup assemblies for aligning peaches of different sizes and having one or more movable segments, and actuator means for causing said one or more movable segments to move.

2. The apparatus of claim 1 wherein said adjustable alignment ring means comprises:

first and second movable alignment ring segments, each segment having a peach contact edge, mounting means carried by said aligner cup assembly for slidably supporting said first and second movable segments, whereby said first and second segments may slide toward each other to align small peaches and away from each other to align large peaches.

3. The apparatus of claim 2 further comprising first and second lugs carried by said first and second movable segments and wherein said actuator means comprises:

movable guide means for engaging said first and second lugs and causing said lugs to move closer together to align a small peach and further apart to align a large peach.

4. The apparatus of claim 3 wherein said movable guide means comprises:
   first and second elongated channels through which said first and second lugs pass, and
   drive means for causing said elongated channels to either move closer together or further apart.

5. The apparatus of claim 4 wherein said peach is removed from said aligner cup assembly to be pitted, and further comprising default setting means for returning said first and second lugs to a default setting after said peach has been removed from said aligner cup assembly to be pitted.

6. The apparatus of claim 1 wherein said adjustable alignment ring means comprises:
   first and second movable alignment ring segments, each segment having a peach contact edge, and
   first and second cam followers carried by said first and second movable alignment ring segments.

7. The apparatus of claim 6 wherein said actuator means comprises:
   an actuation ring having camming surfaces for contacting said first and second cam followers, whereby rotation of said actuation ring causes said first and second movable alignment ring segments to move.

8. The apparatus of claim 1 wherein said adjustable alignment ring means comprises:
   four movable alignment ring segments, each segment having a peach contact edge, and
   a cam follower carried by each of said four movable alignment ring segments.

9. The apparatus of claim 8 wherein said actuator means comprises:
   an actuation ring having camming surfaces for contacting each of said four cam followers, whereby rotation of said actuation ring causes said four movable alignment ring segments to move.

10. The apparatus of claim 2 wherein said actuator means comprises:
    first and second rack gears connected to said first and second movable alignment ring segments, and
    a pinion gear connected to said first and second rack gears, whereby rotation of said pinion gear causes motion of said first and second movable alignment ring segments.

11. The apparatus of claim 2 wherein said actuator means comprises:
    first and second linkage arms connected to said first and second movable alignment ring segments,
    an idler wheel connected to said first and second linkage arms, and
    means for rotating said idler wheel to cause motion of said first and second movable alignment ring segments.

12. The apparatus of claim 2 wherein said actuator means comprises:
    first and second linkage arms each having a first end connected to said first and second movable alignment ring segments,
    means for pivotally connecting the second ends of said first and second linkage arms together at a pivot point,
    means for causing said pivot point to move, thereby causing motion of said first and second movable alignment ring segments.

13. The apparatus of claim 1 further comprising:
    sensing means for sensing the size of a specific peach to be aligned by a specific aligner cup assembly, and
    wherein said actuator means acts in response to said sensing means to cause said one or more movable segments to be positioned properly on said specific aligner cup assembly to align said specific peach.

14. The apparatus of claim 1 further comprising:
    sensing means for sensing the average size of a batch of peaches, and
    wherein said actuator means causes said one or more movable segments to be positioned properly to align said batch of peaches.

15. An automatic peach aligning and pitting mechanism wherein a plurality of aligner cup assemblies is provided for transporting peaches through the alignment and pitting processes, and each of said assemblies has an alignment ring for contacting a peach, and wherein each of said alignment rings is utilized together with an agitator to cause said peach to rotate until the suture line of said peach is aligned for pitting, characterized by:
    an adjustable alignment ring means carried by each of said aligner cup assemblies for aligning peaches of different sizes and having two or more movable segments,
    sensing means for sensing the size of peaches to be aligned by a specific aligner cup assembly, and
    actuator means for causing said two or more movable segments to move in response to said sensing means, whereby said two or more movable segments are positioned properly on said specific cup assembly to align said peaches.

16. The apparatus of claim 15 wherein said adjustable alignment ring means comprises:
    first and second movable alignment ring segments, each segment having a peach contact edge,
    mounting means carried by said aligner cup assembly for slidably supporting said first and second movable segments, whereby said first and second segments may slide toward each other to align small peaches and away from each other to align large peaches.

17. An automatic peach aligning and pitting mechanism wherein a plurality of aligner cup assemblies is provided for transporting peaches through the alignment and pitting processes, and each of said assemblies has an alignment ring for contacting a peach, and wherein each of said alignment rings is utilized together with an agitator to cause said peach to rotate until the suture line of said peach is aligned for pitting, characterized by:
    an adjustable alignment ring means carried by each of said aligner cup assemblies for aligning peaches of different sizes on a peach-to-peach basis and having one or more movable segments,
    sensing means for sensing the size of a specific peach to be aligned by a specific aligner cup assembly, and
    actuator means for causing said two or more movable segments to move in response to said sensing means, whereby said two or more movable segments are positioned properly on said specific cup assembly to align said specific peach.

18. The apparatus of claim 17 wherein said adjustable alignment ring means comprises:
    first and second movable alignment ring segments, each segment having a peach contact edge,
    mounting means carried by said aligner cup assembly for slidably supporting said first and second movable segments, whereby said first and second segments may slide toward each other to align small peaches and away from each other to align large peaches.

19. The apparatus of claim 18 further comprising first and second lugs carried by said first and second movable segments and wherein said actuator means comprises:

movable guide means for engaging said first and second lugs and causing said lugs to move closer together to align a small peach and further apart to align a large peach.

20. The apparatus of claim 19 wherein said movable guide means comprises:

first and second elongated channels through which said first and second lugs pass, and drive means for causing said elongated channels to either move closer together or further apart.

21. The apparatus of claim 20 wherein said peach is removed from said aligner cup assembly to be pitted, and further comprising default setting means for returning said first and second lugs to a default setting after said peach has been removed from said aligner cup assembly to be pitted.

22. The apparatus of claim 17 wherein said adjustable alignment ring means comprises:

first and second movable alignment ring segments, each segment having a peach contact edge, and first and second cam followers carried by said first and second movable alignment ring segments.

23. The apparatus of claim 22 wherein said actuator means comprises:

an actuation ring having camming surfaces for contacting said first and second cam followers, whereby rotation of said actuation ring causes said first and second movable alignment ring segments to move.

24. The apparatus of claim 18 wherein said actuator means comprises:

first and second rack gears connected to said first and second movable alignment ring segments, and a pinion gear connected to said first and second rack gears, whereby rotation of said pinion gear causes motion of said first and second movable alignment ring segments.

* * * * *